Patented Nov. 23, 1943

2,334,961

UNITED STATES PATENT OFFICE 2,334,961

GLASS COMPOSITION

Robert A. Schoenlaub, Tiffin, Ohio, assignor to Owens-Corning Fiberglas Corporation, a corporation of Delaware No Drawing. Application December 5, 1940, Serial No. 368,673

4 Claims. (Cl. 106—50)

The present invention relates to glass composition, and more particularly to a glass free or substantially free from alkali ingredients and which lends itself well to the manufacture of fibers.

Common commercial glasses are made from a mixture of alkalies, lime, or alkali earth, and silicate. Such compositions have been used practically throughout the entire history of glass for common ware. They were evolved largely by experience and represent a compromise between cost and service requirements. They have proven satisfactory for a great number of uses.

However, where a high degree of durability is essential, these common glasses are quite inadequate. Such a condition occurs when they are drawn into fibers for insulation or textiles. Fibers or filaments which are fine enough for such service present to the agencies of chemical attack an enormous specific surface. The alkali of the glass which lies on or near the surface imparts to this surface a hygroscopic property. Water adsorbed from the atmosphere dissolves the alkali, and the resulting solution attacks the silicate and starts a cycle which culminates in the destruction of the fiber. These glasses are also unsuitable for electrical insulation. The presence of alkali renders the glass itself a conductor, particularly at elevated temperatures. Also, the soluble alkali on the hygroscopic surface allows ionic conduction to proceed.

While the removal of the alkali from the glass results in a great improvement in the durability and electrical resistance, this is an extremely difficult thing to accomplish and still obtain a workable glass. Non-alkaline glasses in which the alkali has been replaced by alkaline earth or even with such violent fluxes as calcium fluoride, are generally extremely refractory, and even though they may be melted, the rate of solution of the raw batch is so slow that excessive time and temperatures are required for commercial practice. Moreover, known non-alkaline glasses do not have the ordinary physical stability of alkali glasses and easily revert to the crystalline state. Also such glasses have only short temperature ranges in which the viscosity is suitable for forming or attenuating operations. Since the working range is shorter and occurs at temperatures at which the heat losses are rapid, it is difficult or impossible to form the glass without excessive alterations of equipment and practice.

I have also discovered that non-alkaline glasses are extremely critical in their allowable ranges of ingredients. Slight changes in batch formulas work a revolutionary change in the glasses making them unsuitable for attenuation of fibers therefrom, and it is impossible to predict in what direction the batch may safely be changed in order to produce a successful glass.

An object, therefore, of the present invention is to provide a non-alkaline glass composition which may be easily melted in a relatively short period of time, for example, the time ordinarily necessary for alkali glasses.

Another object of the invention is to provide a non-alkaline glass which is resistant to devitrification, that is, one which has a high viscosity and moves sluggishly at the liquidus temperature to provide for the effective attenuation of fibers therefrom.

Still another object of the present invention is to provide a non-alkaline glass which has a sufficiently broad viscosity curve so that it may be attenuated into fine fibers. If the viscosity curve is narrow, temperature control is too critical and the degree of attenuation is restricted by the rapid cooling of the viscous glass in the region of attenuation.

Still another object of the present invention is to provide a non-alkaline glass composition which is easy to melt and which will not foam excessively during the melting process.

Another object of the present invention is the provision of a non-alkaline glass which may be made, if desired, clear and bright, rather than colored or black.

Other objects and advantages of the present invention will become apparent from the following description.

The invention consists primarily in a narrow range of non-alkaline glass compositions which I have discovered lying in a critical eutectic range. Alkali fluxes are avoided without sacrificing the necessary working properties and yet producing the highly desirable properties of durability and high electrical resistance.

The glasses of my invention lie within a range bounded substantially by the following limits:

|  | Per cent |
|---|---|
| $CaO$ | 16 to 19 |
| $MgO$ | 3 to 6 |
| $Al_2O_3$ | 12 to 16 |
| $SiO_2$ | 52 to 56 |
| $B_2O_3$ | 9 to 11 |

Other fluxes such as fluorospar may be substituted in amounts of 1 to 3% for part of the boron oxide if desired. Alkali in amounts of 1 to 3% may also be used with reduced proportions of boron oxide if circumstances permit.

A specific example of a glass which has been found very satisfactory is:

| | Per cent |
|---|---|
| CaO | 17.5 |
| MgO | 4.5 |
| $Al_2O_3$ | 14.0 |
| $SiO_2$ | 54.0 |
| $B_2O_3$ | 10.0 |

In ordinary alkaline glasses, the eutectic and compound melting points are all so low that wide composition changes may be made without introducing devitrification hazards. The glass of the present invention, however, depends upon eutectic proportions for its melting properties, and consequently is sensitive to composition changes. Slight changes displacing the composition from these eutectics make the glass refractory.

In addition to suitable melting characteristics and durability, a glass to be made into fibers must have suitable working properties, that is, must have a relatively broad temperature range in which the viscosity is suitable for attenuating the glass into fine fibers. The working properties are determined principally by the ratio of the silica to calcium oxide. This ratio in the present invention is in a range of approximately 11.5:4 to 13.5:4. If the range disclosed is exceeded as by decreasing the calcium oxide to 15% and accordingly increasing the silica, the glass becomes so viscous that excessive temperatures are required to obtain flow of the glass through the feeder outlets in fiberizing apparatus. On the other hand if the calcium oxide is increased to 20% with a corresponding decrease of silica, the glass will become too watery, and the temperature range wherein the viscosity is suitable for attenuating will be too narrow.

A decrease of calcium oxide below 16% causes silica devitrification and an increase above 19% causes devitrification of various calcium bearing compounds at the temperatures to which it is necessary to heat the glass to obtain proper flow through the feeder outlets.

The silica content must also be maintained within the range specified since an excess of silica above 56% causes silica devitrification and a content of silica less than 52% causes various calcium bearing compounds to devitrify at the temperatures employed in attenuating fibers.

Magnesia has a particularly critical effect on the melting temperature. Since it crystallizes in and controls the devitrification of diopside ($CaOMgO2SiO_2$), and since the ratio of the molar weight of magnesia to that of diopside is 1:5.4, a small excess or deficiency of magnesia results in a correspondingly large variation of diopside. Eutectic proportions require a magnesia content of approximately 4.5%. If magnesia is increased beyond 6% the glass becomes oversaturated with diopside and devitrification will occur at the required attenuating temperature. Also, a deficiency of magnesia below 3% will cause miscellaneous devitrification at temperatures slightly above desired attenuating temperatures. It is to be pointed out that magnesia and calcium oxide are not equivalents in this glass.

The glass reacts to alumina content somewhat similarly to magnesia content. Eutectic proportions require alumina in proportions of approximately 14%, a higher content than 16% and a content less than 12% causes devitrification at attenuating temperatures.

It has been discovered that boron oxide affects the melting characteristics in a peculiar manner. Apparently, a form of devitrification occurs upon cooling because calcium oxide precipitates in combination with the boron oxide. This condition is aggravated by boron oxide contents higher than about 11%. A decrease of boron oxide below 9% decreases the stability of the glass and causes rapid devitrification at higher temperature. Further, boron oxide added in amounts greater than about 11% increases the hygroscopicity of the glass, and the surface of fibers made therefrom become spongy and may even actually scale. An increase in boron oxide above about 11% also makes the glass difficult to make and such glasses are apt to be opaque.

The glasses of the present invention may be melted and founded in the usual day or continuous tanks with only slight alterations of practice. These glasses have frequently been made in ton loads in day tanks without exceeding 1420° C. on a twenty-four hour cycle. Occasionally, with lower temperatures, and also in higher silica ranges, solution of the silica of the batch is lower and desirable effects are obtained by the addition of one or two percent fluorospar in molecular replacement of calcium oxide. Sulphates also promote the solution of silica, but have a tendency to blanket the glass with foam which is often difficult to break. No unusual corrosion of refractories is encountered at the melting temperatures.

The distinguishing feature of this alkali-free glass is its fusibility and stability. In these respects it is somewhat similar to common alkali glasses. These desirable properties have been achieved by adjusting the proportions of the otherwise more or less refractory substances to eutectic proportions. Such proportions may be considered as compositions of matter so related that the individual constituent phases which may be precipitated from the glass by cooling mutually flux each other to a homogeneous glass at substantially the minimum melting temperature.

Such an adjustment achieves fusibility apparently for the reason that the rate of fusion is dependent among other things upon the degree of undersaturation of the component substances at the temperatures used for melting. If the temperature at which all constituents are mutually soluble in each other is adjusted to a practical minimum the rate of fusion at the melting temperature is rapid. The stability is obtained because the viscosity at the lower end of the working range is so great it impedes devitrification.

Glasses of the designated composition have some surprising physical properties. One important property of these glasses is their high electrical resistance. This resistance throughout the body of glass is enormous and unless the surface is contaminated, there is negligible surface leakage. This is indicated by the results of tests performed on similar insulating tapes of fibrous mineral materials which were exposed forty-eight hours to a 90% humidity, washed in distilled water, and tested at 100° F. The resistance of my non-alkaline glass is in the order of 410 megohms. The resistance of clean alkali glasses is generally in the order of 3.2 megohms and asbestos is generally about .2 megohm.

The batch fluxes readily and is somewhat easier to work than alkali glasses. The drawing range of the glass is in the neighborhood of 2000° F. to 2400° F. Moreover, it is almost impossible to devitrify the glass under ordinary conditions. Glasses made in accordance with the present invention may be not only formed into the usual pressed, blown, or extruded objects commonly found in the art, but may also be attenuated into extremely fine fibers by such methods as, for example, found in the Slayter and Thomas Patent 2,133,236. It is also possible to mechanically draw such glass into continuous filaments by means of a spool running at high speeds, as, for example, as high as 6,000 to 10,000 feet per minute or even higher, from an apparatus similar to that disclosed in the copending Slayter and Thomas application Serial Number 105,405, filed October 13, 1936, now Patent No. 2,234,986.

Glass fibers produced by the above methods may be extremely fine, having diameters, for example, in the order of about .0001 to .0003 inch more or less. The fibers or filaments may be successfully fabricated into strands, twisted yarns, ply yarns, and then interwoven, knitted or braided into various fabrics as disclosed, for example, in the Slayter and Thomas Patent 2,133,238. Such fabrics have extremely high electrical resistance and resistance to moisture and other deleterious agents.

When subjected to steam for a period of forty-eight hours, a treatment which destroys fibers of an alkali glass, no detectable deterioration occurs. When heated to 300° C., fibers of this alkali-free glass will gain about 20% in tensile strength while fibers of alkali glass will lose about the same amount.

Various modifications and variations may be made in the present invention within the scope and spirit of the invention as defined in the appended claims.

I claim:

1. Glass in the form of fine fibers having substantially the following composition: CaO 16 to 19%, MgO 3 to 6%, $Al_2O_3$ 12 to 16%, $SiO_2$ 52 to 56%, and $B_2O_3$ as an auxiliary flux in amounts of substantially 9 to 11%.

2. A fibrous glass textile, the glass whereof contains: CaO 16 to 19%, MgO 3 to 6%, $Al_2O_3$ 12 to 16%, $SiO_2$ 52 to 56%, and 9 to 11% auxiliary flux including $B_2O_3$ as a major constituent.

3. As an article of manufacture, fibrous glass containing: CaO 17.5%, MgO 4.5%, $Al_2O_3$ 14%, $SiO_2$ 54%, and $B_2O_3$ in amounts about 10%.

4. A fibrous glass textile whose glass contains no first group alkalies and has the following composition: CaO 16 to 19%, MgO 3 to 6%, $Al_2O_3$ 12 to 16%, $SiO_2$ 52 to 56%, and $B_2O_3$ as an auxiliary flux in amounts of substantially 9 to 11%.

ROBERT A. SCHOENLAUB.